Dec. 11, 1962 B. I. ULINSKI 3,068,019
GEOMETRIC STEERING FOR INDUSTRIAL TRUCK
Filed Nov. 5, 1959 3 Sheets-Sheet 1
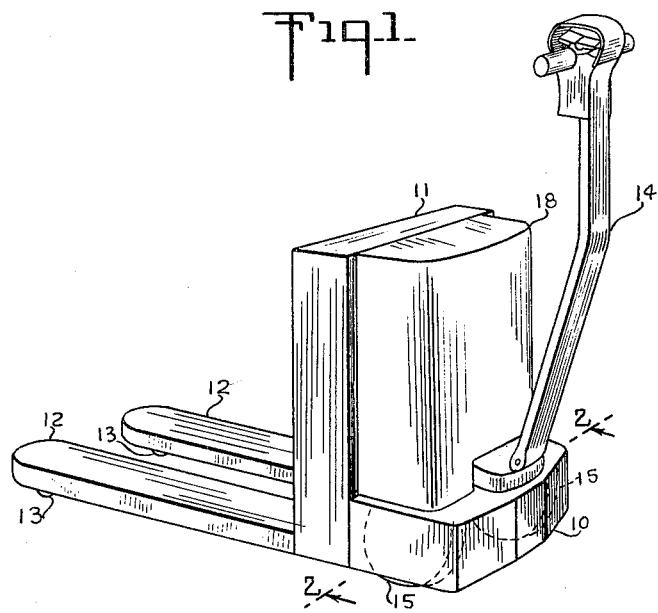
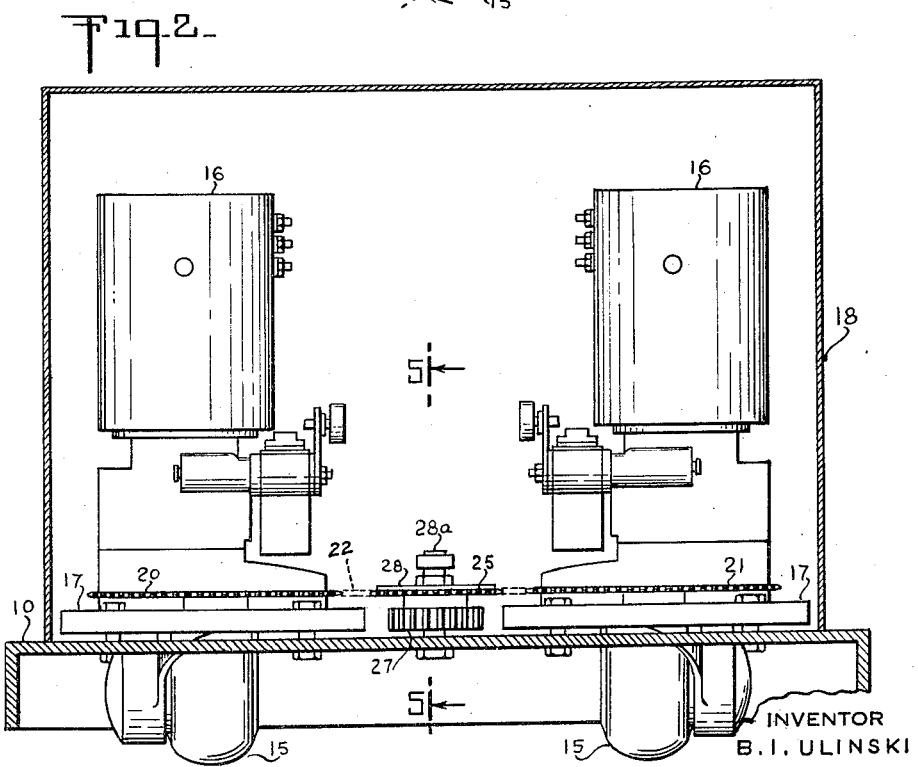
INVENTOR
B. I. ULINSKI
BY
ATTORNEY Dec. 11, 1962  B. I. ULINSKI  3,068,019
GEOMETRIC STEERING FOR INDUSTRIAL TRUCK
Filed Nov. 5, 1959  3 Sheets-Sheet 2

INVENTOR
B. I. ULINSKI
BY
ATTORNEY

Dec. 11, 1962  B. I. ULINSKI  3,068,019
GEOMETRIC STEERING FOR INDUSTRIAL TRUCK
Filed Nov. 5, 1959  3 Sheets-Sheet 3
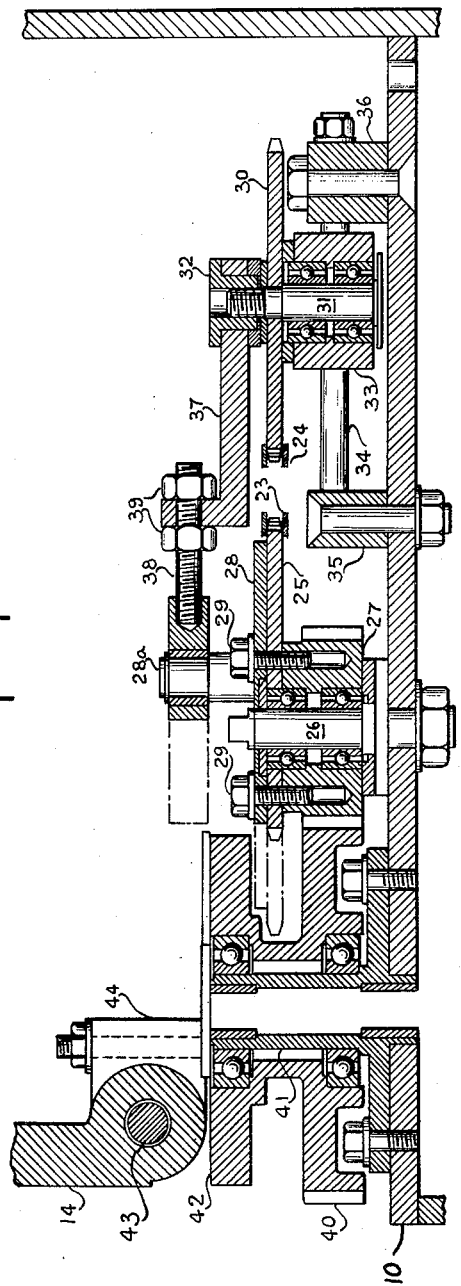
INVENTOR
B.I. ULINSKI
BY
ATTORNEY United States Patent Office 3,068,019
Patented Dec. 11, 1962

3,068,019
GEOMETRIC STEERING FOR INDUSTRIAL TRUCK
Bronislaus I. Ulinski, Flossmoor, Ill., assignor to The Yale and Towne Manufacturing Company, Stamford, Conn., a corporation of Connecticut
Filed Nov. 5, 1959, Ser. No. 851,045
8 Claims. (Cl. 280—103)

This invention relates to the steering of two wheels on an industrial truck.

In trucks of the particular class, it is necessary to achieve steering through a very wide angle, yet the steering must be geometrically correct. Those persons skilled in the art will understand that geometrically correct steering will enable the truck wheels to move without slide-slip over the ground when the truck is steered. That can be achieved by so steering the steering wheels that the axes of all of the truck wheels always will intersect at a common point. A very considerable problem is involved in the designing of the steering mechanism because there generally is little room available for the mechanism on the industrial truck, and because of the extremely wide angle of steer. Actually, there is today an increasing demand for industrial trucks that will steer through 360°, but because of the considerations I have mentioned, it has been very difficult to equip those trucks with practical and effective geometric steering.

Through the exceedingly novel concept of my invention, I contribute geometric steering mechanism that will very effectively steer two wheels on an industrial truck, and that will correctly steer those wheels through a very wide angle. In fact, it is possible through the concept of my invention, to achieve a full 360° or more of the correct steering rotation.

In addition, I can utilize the novel geometric steering mechanism of my invention to extremely good effect on a motorized hand truck, enabling me to steer two wheels on such a truck. It will be appreciated that the industrial trucks of that kind generally have a steering handle that forms a part of a steering and traction unit, and that extends forwardly so that the operator, while walking ahead of the truck, can rotate the unit bodily to steer the truck. It has already been suggested that two wheels be utilized to support the front end of a motorized hand truck, since the truck then will be more stable. However, that introduces a further problem since the trucks then require geometric steering that will control the particular relation between the steering handle and two steering and traction units, or perhaps one such unit and an idle steering wheel. My novel mechanism solves that problem, and enables two steering and traction units to be very effectively utilized on a motorized hand truck.

As an important feature of my invention, I utilize to control the geometric steering of two truck wheels a control wheel that will rotate in such a ratio as to make one complete revolution should the truck wheels be steered through 180°. It will be appreciated that a truck wheel, when steered to positions that are 180° apart, will nevertheless be in the same steering position, in effect. My control wheel will make a further revolution in those cases in which the truck wheels are steered beyond 180°, so that the control wheel always will effect geometric control of the steering movements, whether the truck wheels are steered through 180°, 360°, or actually through any angle.

In more detail, I control the steering rotation of the two steering wheels of the truck through a chain that is meshed with a steering sprocket on each wheel. My control wheel is formed with a periphery that in effect is one-half the periphery of a sprocket, and is arranged in contact with the chain at a point between the two sprockets. Further, my control wheel is so mounted as to have an eccentric movement. The control wheel then will act through the chain and sprockets to effect different rates of steering of the two truck wheels, and the steering will be geometrically correct through any angle to which the wheels may be steered.

In utilizing my novel steering mechanism on a motorized hand truck, I mount the chain sprockets on two steering and traction units or on one unit and one wheel mounting, as the case may be. As a feature of this part of my invention, I actually utilize the control wheel to operate the chain, with the control wheel rotated by the steering handle of the truck. I then arrange between the steering handle and the control wheel a gear ratio that is particularly related to the ratio between the control wheel and sprockets. Thereby I hold not only the truck wheels but also the steering handle in geometric relation to one another, and I can do that through any angle to which the handle may be steered.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings,

FIG. 1 shows an industrial truck that is equipped with my novel steering mechanism;

FIG. 2 is a section on the line 2—2 in FIG. 1;

FIG. 5 is a section showing details of my steering mechanism, taken on the line 5—5 in FIG. 2.

Figure 3:
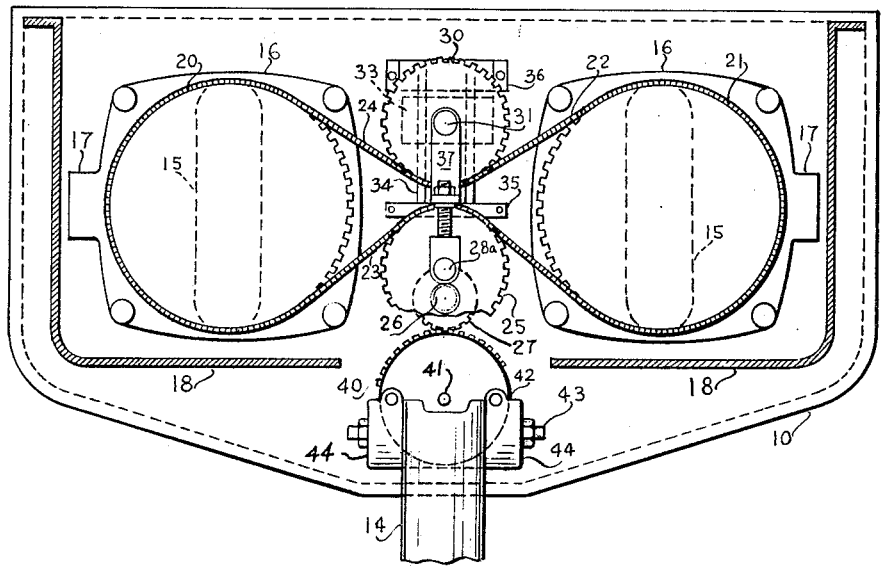
FIG. 3 is a somewhat diagrammatic plan view showing my steering mechanism on a part of the truck.

For the purpose of describing my invention, I have chosen to show in FIG. 1 a motorized hand truck T having a forward frame 10, a battery compartment 11, and a pair of rearwardly extending legs 12 that are adapted to engage a load. Beneath the legs 12 are a pair of wheels 13 on which the rear end of the truck T will move. As is usual in trucks of the particular class, the front of the truck T has a steering handle 14 that enables the truck operator to steer the truck while walking ahead of the truck. The steering handle 14 will act through my novel steering mechanism, which I shall describe in detail, to effect steering rotation of a pair of front wheels 15 on the truck.

In the truck T that I illustrate, each wheel 15 is a part of a steering and traction unit 16 as shown in FIG. 2, those units being similar to the one that is shown in my earlier application Serial No. 562,710, now Patent No. 2,950,773, issued August 30, 1960. Of course, I do not wish to be limited to two steering and traction units, since my steering mechanism can very well be used on those trucks having two steering wheels, when one or both of the wheels are merely idlers with simple steering mountings. As I show in FIG. 2, each steering and traction unit 16 is individually mounted through a bearing assembly 17 for steering rotation on the truck frame 10.

In FIG. 1, I show a cover 18 enclosing both of the units 16. Further details of the truck and the steering and traction units 16 are not important to an understanding of my invention, and it is merely necessary here to know that my novel steering mechanism, when utilized on the truck T, will be actuated by the steering handle 141 whereby to steer both wheels 15.

Figure 4:
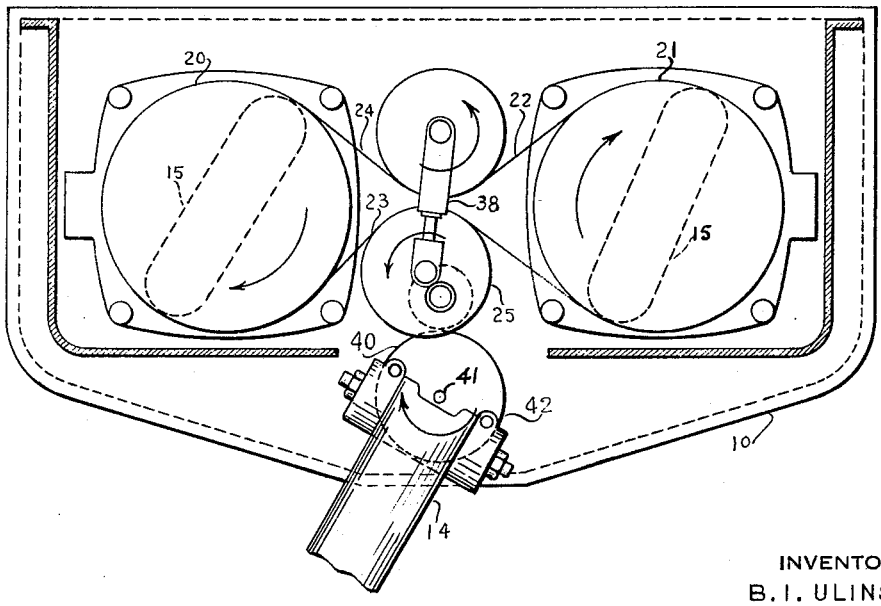
FIG. 4 is a diagrammatic view showing the mechanism in a different steering position.

In the exceedingly novel steering mechanism of my invention, I utilize a pair of sprockets 20, 21, FIGS. 2, 3 and 4, that are mounted on the steering and traction units 16 so that one sprocket will rotate integrally with the steering of each truck wheel 15. A chain 22 is engaged about both sprockets 20, 21, as is well shown in FIG. 3, with opposed parts 23, 24 of the chain moving between the sprockets as the wheels 15 are seated. In contact with the part 23 of chain 22, is a control wheel 25 that I particularly form with a periphery that is one-half the periphery of each sprocket 20, 21. It will be appreciated that the control wheel 25 then will rotate in such a ratio as to make one full revolution should the truck wheels 15 be steered 180°. I shall refer again to that ratio, but it will be well first to describe fully the construction that I show in the drawings.

Referring now to FIG. 3, and in more detail to FIG 5, I prefer to make the control wheel 25 circular, with that wheel mounted to rotate in an eccentric axis about a shaft 26 on truck frame 10. Thus, the control wheel 25 when rotating will have eccentric movements, and will effect differential movements of chain 22 so that the spockets 20, 21 will rotate at different rates. A gear 27 and an eccentric mounting plate 28 also are mounted on shaft 26, and are assembled relatively to control wheel 25 through bolts 29 whereby to rotate integrally with one another. The plate 28 is equipped with a bearing pin 28a that is in eccentric relation to the shaft 26, for a purpose that will be described.

In contact with the opposed part 24 of chain 22, I utilize a take-up wheel 30, well shown in FIGS. 3 and 5. The take-up wheel 30 in my preferred construction is circular, and is secured at its center to a shaft 31, as by a bushing 32 that is threaded to shaft 31, FIG. 5. I mount the shaft 31 to rotate on a block 33, that block in turn being mounted to slide on rods 34 whereby to support shaft 31 and wheel 30 for movement in a direction transverse to the chain part 24, all as is well shown in FIG. 5. To support the rods 34, I may very well utilize support blocks 35, 36 that are bolted to truck frame 10.

My mechanism further has a link 37 that extends between the eccentric pin 28a and the bushing 32, as may clearly be seen in FIG. 5. Link 37 preferably has a portion 38 that can be adjusted through nuts 39 to change the length of link 37, should that be desired. Through the link 37, the eccentric pin 28a will act, as the control wheel 25 rotates, to move the take-up wheel 30 in a direction to compensate for the differential chain movements that are brought about by wheel 25. Thereby, the take-up wheel 30 will hold chain 22 in positive meshing relation to sprockets 20, 21, enabling the control wheel 25 to apply a more precise and effective control to the sprockets.

Referring again to FIG. 5, I utilize on the truck T a steering gear 40 that rotates on a mounting 41 relatively to truck frame 10, while in meshing relation to the control gear 27. The ratio between the steering gear 40 and gear 27 is inverse to that between the control wheel 25 and sprockets 20, 21, and is 1 to 2 in the construction that I show. I rotate steering gear 41 through a handle mounting plate 42 that may very well be formed integrally with gear 41, and I support the steering handle pivot 43 on plate 42 through rather usual members 44 that are bolted to plate 42. Thereby it will be understood that the steering handle 14, when steered by the truck operator, will rotate the steering gear 40 on its mounting 41. Moreover, handle 14 will act through steering gear 40 and gear 27 to rotate the control wheel 25 through an angle that is double the angle through which the handle 14 is steered. Thereby I enable the control wheel 25 to hold the truck wheels 15 in predetermined relation to steering handle 14, while effecting geometric steering of truck wheels 15 through any angle to which they may be steered, as I shall now describe.

The operation of my novel steering mechanism will be more easily understood if we first assume a condition in which the steering wheels are steered through 180°, or in other words, between steering positions that in effect are the same. It will be remembered that the control wheel 25 then will make a full revolution so as to return exactly to its initial position. Therefore, control wheel 25 by acting through chain 22 will hold both truck wheels 15 in the same position relatively to one another whether those wheels 15 are in 0° or 180° steering positions. At all angles between those steering positions of the truck wheels, the control wheel 25 by its eccentric movements will effect geometric steering of wheels 15. If we assume that the truck wheels 15 are steered more than 180°, as may be done on some industrial trucks, the control wheel 25 will make a further revolution so that wheel 25 actually will repeat the same control that was applied during the first revolution. Because control wheel 25 acts in that way, I am able through my novel steering mechanism to effect full geometric control of a pair of steering wheels, whether those wheels are steered through 180°, 360°, or in fact through any larger or smaller angle.

In addition, the novel concept of my invention enables me always to steer a motorized hand truck in a direction that is in predetermined geometric relation to the steering handle of the truck. That will be more fully appreciated when considering the ratio between the steering gear 40 and control gear 27, as related to the ratio between control wheel 25 and each sprocket 20, 21. Through that relation, I am able always to steer the truck in the direction in which the handle 14 is steered, while so steering the truck wheels 15 relatively to one another as to effect the proper geometric steering. Further, that will be true through any angle to which the handle 14 may be steered. Also, my steering mechanism will require but little space on the truck. Thus, it is possible through my invention to equip a motorized hand truck very effectively with geometric steering, when considering not only the steering wheels of the truck, but also the steering handle.

Naturally, my mechanism can be used to extremely good effect to steer two wheels on other types of industrial truck, and therefore I do not wish to be limited to the utilization of a steering handle to actuate by mechanism. It is to be understood that my steering mechanism may be actuated through any desired means, whether or not those means are arranged to act through the control wheel 25.

I may call attention to the fact that my steering control wheel 25 can rather easily be adapted to effect the geometric steering control that will be correct for a truck of a shorter or longer wheel base. It will be appreciated, of course, that the particular eccentric offset of the control wheel 25 will determine that steering relation of the two truck wheels 15 which will be proper for a particular truck wheelbase. Merely by making the control wheel 25 adjustable or by replacing it with another wheel, the eccentric offset of the wheel can be changed so as to effect geometric steering for a different wheelbase.

I believe that the construction and operation of my novel steering mechanism will now be understood, and that those persons skilled in the art will fully appreciate that I have made a novel contribution having a very considerable value in the industrial truck art.

I now claim:
1. In a truck of the class described, a pair of steering wheels individually mounted for steering rotation, a circular sprocket rotating with the steering rotation of each wheel, a chain engaged about both sprockets with opposed parts of the chain moving between said sprockets as the wheels are steered, a control wheel arranged with its periphery in contact with a part of the chain that extends between the sprockets, said control wheel being formed with its periphery one-half that of each sprocket whereby in effect to rotate in a ratio of 360° to 180° of the steering rotation of each sprocket, means mounting the control wheel to rotate in an eccentric axis, so that the chain by moving over the periphery of said control wheel will have differential movements to effect different rates of steering rotation of the two sprockets relatively to one another, means coacting with an opposed part of said chain between the two sprockets to take up the differential chain movements that are effected by the control wheel, and said control wheel adapted by its ratio of rotation relatively to the sprockets to effect geometric steering of the steering wheels through all angles of steering including a full 360°.

2. In a truck of the class described, a pair of steering wheels individually mounted for steering rotation, a sprocket rotating with the steering rotation of each wheel, a chain engaged about both sprockets with opposed parts of said chain moving between said sprockets as the wheels are steered, a control wheel arranged with its periphery in contact with a part of the chain between the sprockets, said control wheel being formed with its periphery one half that of each sprocket whereby in effect to have double the angular rotation of each sprocket, mounting means in which the control wheel when rotating has an eccentric movement, so that the chain by moving over the periphery of said control wheel will have differential movements to effect different rates of steering rotation of the two sprockets relatively to one another, a take up wheel engaged with an opposed part of the chain, means actuating said take up wheel in predetermined relation to the rotation of the control wheel whereby to compensate the differential movements of the chain, and said control wheel adapted by its double rotation relatively to the sprockets to effect geometric steering of the steering wheels through all angles of steering including a full 360°.

3. In a truck of the class described, a pair of steering wheels individually mounted for steering rotation, a circular sprocket rotating with the steering rotation of each wheel, a chain engaged about both sprockets with opposed parts of the chain moving between said sprockets as the wheels are steered, a circular control wheel arranged with its periphery in contact with a part of the chain between the sprockets, said circular control wheel having a diameter one-half that of each sprocket whereby in effect to rotate in a ratio of 360° to 180° of the steering rotation of each sprocket, means mounting said circular control wheel to rotate in an eccentric axis, so that the chain by moving over the periphery of said control wheel will have differential movements to effect different rates of steering rotation of the two sprockets relatively to one another, a circular take up wheel engaged with an opposed part of the chain, a link moving said take up wheel in predetermined relation to the rotation of the control wheel whereby to compensate the differential movements of the chain, and said control wheel adapted by its ratio of rotation relatively to the sprockets to effect geometric steering of the steering wheels through all angles of steering including a full 360°.

4. In a truck of the class described having a steering handle and a pair of steering wheels that are individually mounted for steering rotation, a sprocket rotating with the steering rotation of each wheel, a chain meshed with both sprockets and moving between the sprockets as said sprockets rotate, a control wheel arranged with its periphery in contact with a part of the chain between the sprockets, said control wheel being formed with its periphery one-half that of each sprocket whereby in effect to have double the angular rotation of each sprocket, means connecting the steering handle in predetermined relation to the control wheel and through which said steering handle rotates said control wheel whereby to steer the steering wheels through said chain mounting means on which the control wheel when rotated has an eccentric movement so that said wheel by its chain contact will effect different rates of steering rotation of the two sprockets relatively to one another, and said steering handle adapted by the double rotation of the control wheel relatively to the sprockets to effect geometric steering rotation of the steering wheels relatively to the handle and to one another through all angles to which the handle may steer those wheels.

5. In a truck of the class described having a rotating steering handle and a pair of steering wheels that are individually mounted for steering rotation, a sprocket rotating with the steering rotation of each wheel, a chain meshed with both sprockets and moving between said sprockets as the wheels are steered, a control wheel arranged with its periphery in contact with a part of the chain between the sprockets, said control wheel being formed with its periphery one-half that of each sprocket whereby in effect to have double the angular rotation of each sprocket, means mounting the control wheel to rotate in an eccentric axis so that the chain by moving over the periphery of said control wheel will have predetermined movements to effect different rates of steering rotation of the two sprockets relatively to one another, and means through which said steering handle when rotated will rotate said control wheel in a ratio inverse to that between the control wheel and sprockets, so that said handle will effect steering of the steering wheels in geometric relation to said handle and to one another.

6. In a truck of the class described, a pair of steering wheels that are individually mounted for steering rotation, a sprocket rotating with the steering rotation of each wheel, a chain meshed with both sprockets and moving between the sprockets as the sprockets rotate, a control wheel arranged with its periphery in contact with a part of the chain between the sprockets, a steering handle for rotating said control wheel whereby to steer the steering wheels, mounting means on which the control wheel when rotated has an eccentric movement, so that said wheel by its chain contact will rotate each sprocket at a rate different from the rotation of the control wheel whereby to effect geometric steering, and gears through which said steering handle rotates said control wheel with a gear ratio that maintains the steering wheels in geometric relation to said handle.

7. In a truck of the class described having a rotating steering handle and a pair of steering wheels that are individually mounted for steering rotation, a circular sprocket rotating with the steering rotation of each wheel, a chain engaged about both sprockets with opposed parts of the chain moving between said sprockets as the wheels are steered, a circular control wheel arranged with its periphery in contact with a part of the chain between the sprockets, said circular control wheel having a diameter one-half that of each sprocket whereby in effect to have double the angular rotation of each sprocket, means mounting the circular control wheel to rotate in an eccentric axis so that the chain by moving over the periphery of said circular wheel will have differential movements to effect different rates of steering rotation of the two sprockets relatively to one another, a take up wheel engaged with an opposed part of the chain, a link moving said take up wheel in predetermined relation to the rotation of the control wheel whereby to compensate the differential movements of the chain, and gears through which said steering handle when rotated will rotate said control wheel through double the angle of handle rotation, so that said steering handle will act through any angle to which it may be rotated to steer the steering wheels in geometric relation to said handle and to one another.

8. In a truck of the class described, a pair of steering wheels individually mounted for steering rotation, a circular sprocket rotating with each wheel, a chain engaged about both sprockets with parts of the chain moving between said sprockets as the wheels are steered, a control sprocket in contact with a part of the chain, means mounting said control sprocket to rotate in an eccentric axis, so that the chain by moving over the periphery of said control sprocket will have differential movement to effect different rates of steering rotation of the two wheels relatively to one another, a take up member engaged with a further part of the chain, and means extending between said take up member and control sprocket to move said member in predetermined relation to the eccentric movements of the control sprocket, whereby to compensate positively for the differential movement of the chain.

References Cited in the file of this patent

UNITED STATES PATENTS

| | | | |
|---|---|---|---|
| 239,432 | Bollee | Mar. 29, | 1881 |
| 949,202 | Shedenhelm | Feb. 15, | 1910 |
| 1,801,043 | Harber et al. | Apr. 14, | 1931 |
| 2,055,747 | Laube et al. | Sept. 29, | 1936 |
| 2,470,496 | Krilanovich | May 17, | 1949 |
| 2,720,006 | Carter et al. | Oct. 11, | 1955 |
| 2,848,247 | Schreck | Aug. 15, | 1958 |
| 2,913,063 | Brown | Nov. 17, | 1959 |
| 2,982,564 | Schreck | May 2, | 1961 |